Feb. 8, 1949.　　　　G. V. PECK　　　　2,460,903
MOTOR STARTING CAPACITOR ASSEMBLY
Filed May 21, 1945
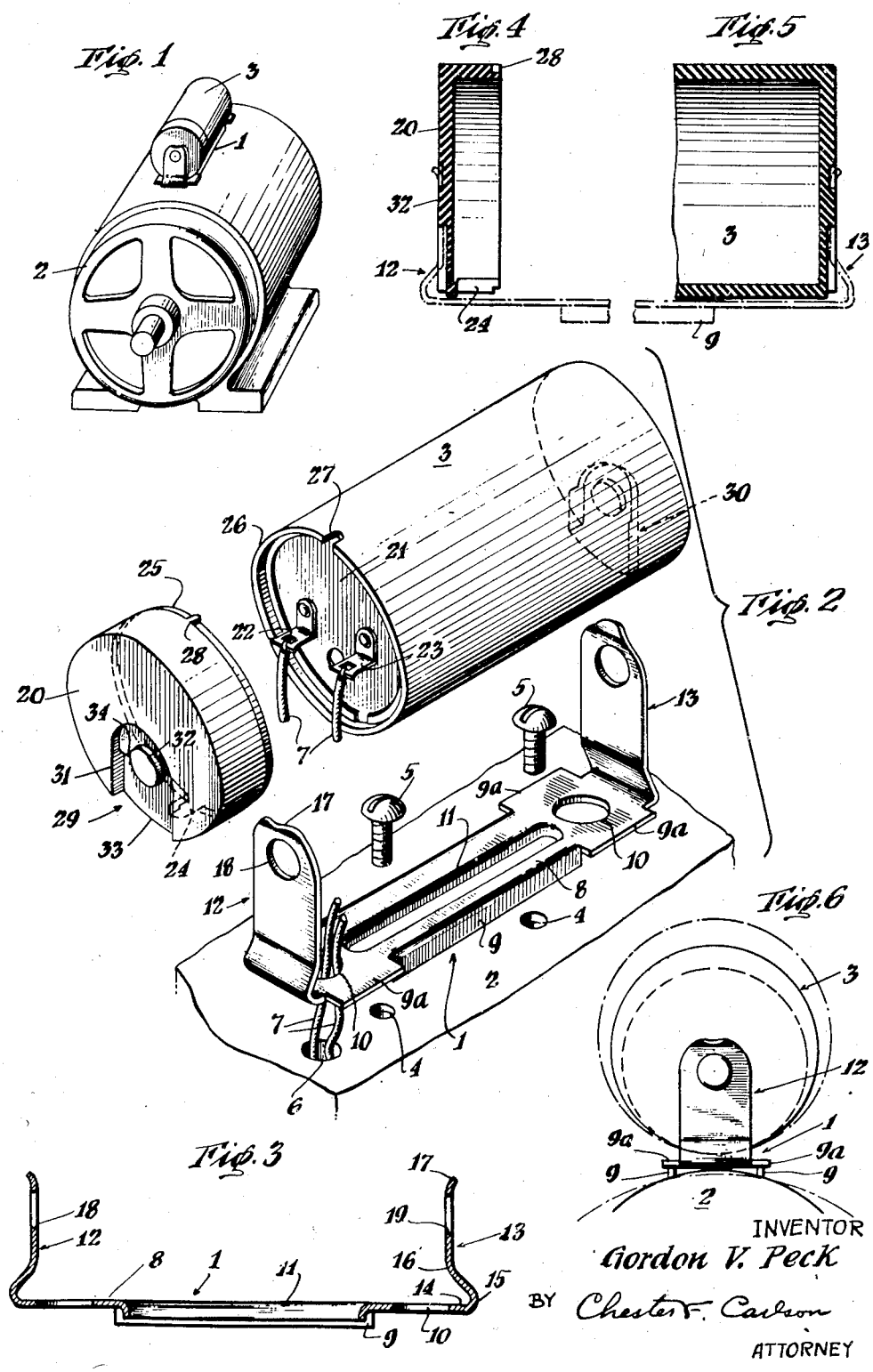
INVENTOR
Gordon V. Peck
BY Chester F. Carlson
ATTORNEY Patented Feb. 8, 1949

2,460,903

UNITED STATES PATENT OFFICE 2,460,903

MOTOR STARTING CAPACITOR ASSEMBLY

Gordon V. Peck, Indianapolis, Ind., assignor to P. R. Mallory & Co., Inc., Indianapolis, Ind., a corporation of Delaware Application May 21, 1945, Serial No. 594,835

10 Claims. (Cl. 175—315)

This invention relates to electric capacitors and has particular reference to mounting arrangements therefor.

An object of this invention is to provide improved capacitors and mounting means and structure therefor.

Other objects will be apparent from the following specification and claims.

In the drawings:

Figure 1 is a perspective of an illustrative embodiment of this invention showing an A. C. motor with a starting condenser assembly thereon;

Figure 2 is an exploded view of the condenser assembly of Figure 1;

Figure 3 is a central longitudinal section of the bracket of Figure 1;

Figure 4 is a central section of the condenser housing cap;

Figure 5 is a partial view, in central section, of the condenser housing, showing the base; and Figure 6 is an illustration of the assembly of any one of a variety of condensers and supports with a single bracket.

A particular application of this invention is in the use of electrolytic condensers in A. C. motor starting condenser assemblies. The condenser assembly of this invention may, however, be used in other applications, or an electrostatic condenser may be substituted for the electrolytic condenser.

An important advantage of this invention is that the condenser elements, the electrodes and electrolyte, are encased in their own self-enclosed non-conductive terminal box. No extra side wall covers or casings are needed.

Referring to the drawings, Figure 1 shows an electric motor having a starting condenser mounted thereon. The assembly comprises a bracket 1 secured to the motor housing 2, and a condenser housing 3 mounted in the bracket 1.

The motor housing 2 is provided with threaded screw or bolt holes 4 (Figure 2) for receiving bolts 5 for securing the bracket 1 to the motor housing 2, and also provided in the motor housing is a lead wire opening 6 through which the lead wires 7 are passed in connecting the motor with the condenser. The lead wire opening is located on the motor housing 2 adjacent and in alignment with the bolt holes 4 so as to be located beneath the bracket 1 when the bracket is secured to the motor housing.

The bracket 1 (see Figures 2 and 3) generally comprises an elongated body portion 8 with integral depending sides 9 forming an inverted U channel. The body sides 9 are uniformly bent down solid side edge portions of the body 8 and both extend throughout the central length of the body 8 in duplicate form and position. A pair of side wings 9a remain at each end of the body 8 to provide greater strength therefor. These wings if bent down, would match up with and form a continuation of the depending sides 9. Adjacent each end of the bracket body 8 circular openings 10 for the passage of lead wires 7 from the motor are formed laterally centrally of the body so that the bracket 1 is reversible end for end in being mounted on the motor housing 2. Only one of the openings 10 is used at one time, depending on which end of the bracket 1 is located over the motor housing lead wire opening 6. The lead wires 7 thus extend from the opening 6 beneath the bracket 1 directly up through one of the openings 10 in the bracket 1 and are afforded protection by the body sides 9.

An elongated generally rectangular central bolt opening 11 is formed in the bracket body 8, extending along the longitudinal center line thereof to points adjacent each of the lead wire openings 10. The bolt opening 11 receives the bolts 5 in securing the bracket 1 to the motor housing 2, and has side walls depending to a less extent than the bracket body side walls 9. The side walls of the bolt opening provide countersink and side bearing surfaces for the bolts 5. The elongation of the bolt opening 11 permits a variation in the spacing and positions of the bolt holes 4 in the motor housing 2.

The bracket 1 is further provided, at each end of the body 8, with integral resilient uprights 12 and 13 formed by bending up end extensions of the bracket body 8, and between which the condenser housing 3 is received and held with the longitudinal axis of the housing extending in the same general direction as that of the bracket body 8. The uprights 12 and 13 are duplicates in form, size and position with respect to the bracket body 8. They have generally the same lateral and thickness dimensions as the bracket body 8, and extend a substantial distance upward therefrom. Each of the bracket uprights 12 and 13 begins, see Figure 3, as a short longitudinal continuation 14 of the bracket body 8, without the depending sides 9 or side wings 9a. Each upright then executes an upward short radius curve 15 to thereafter extend for a short straight line distance upward and back over itself to a point 16 overlying the adjacent end of the bracket body 8 as defined by the nearest edge of the side wings 9a, and then straight up to terminate in a rounded arch form with the top of the arch 17 bent outward in the direction of the longitudinal extent of the bracket body 8. Thus, the uprights 12 and 13 face each other across the length of the bracket body 8; and may resiliently contain the condenser housing 3 therebetween. The curved portion 15 of each upright provides extra strength for this resilient containing action and the outwardly bent top portions 17 provide cam-like surfaces to aid in the assembly and disassembly of the condenser housing 3 with respect to the bracket 1. The bracket uprights 12 and 13 respectively have circular openings 18 and 19 therethrough in duplicate size and position for the reception of assembly pins provided on the ends of the condenser or condenser assembly which may be contained between the uprights 12 and 13. The duplication of the size, form, and position of the uprights 12 and 13 is the preferable arrangement, since the bracket or condenser may be reversed end for end in assembly if desired. However, it is within the scope of this invention for the uprights and the openings 18 and 19 therein to be different in size, form and position.

The condenser to be mounted in the bracket 1 may comprise simply the unit of the housing 3 or it may comprise an assembly of the unit of the housing 3 and a cap 20. The preferred arrangement is that of the assembly of the housing and the cap but formations or devices to aid in mounting a condenser in the bracket 1 may be used with the housing unit alone or with the housing unit and spacers or adaptors, in similarity with the formations hereafter disclosed for the housing and cap assembly.

The unit of the condenser housing 3 and the cap 20 may be held together mainly by the opposing bracket uprights 12 and 13, or there may be, in addition, a securing arrangement between the cap and the housing such as threaded formations, a bayonet-type lock or some other similarly suitable joining or securing arrangement.

In the preferred embodiment of the condenser housing and cap assembly shown in Figures 2, 4 and 5 the housing and cap are each formed of molded Bakelite as a cylinder with one end integrally closed and the other open. Other materials may be used, for example, other plastics, glass or any non-conductive material of suitable strength. Also, shapes other than cylindrical may be used if desired.

The housing 3 contains the usual electrolytic or electrostatic condenser elements and has a closure and sealing disc 21, normally formed of Bakelite, mounted within its open end and supporting a pair of electrode terminals 22 and 23. The terminals 22 and 23 may be formed of tinned steel or brass, and they extend outwardly from the closure disc 21 to project somewhat beyond the open end of the housing 3 and thus into the cap 20 when the cap and housing are assembled. One of the connection leads 7 is secured to each of the terminals 22 and 23, and when the condenser assembly is mounted in the bracket 1, the connection leads 7 extend from the terminals 22 and 23, through a side wall opening 24 in the condenser cap 20 formed U shaped with its open end at the open end of the cap as a notch in the annular end surface of the cap, and through the bracket body opening 10 to the motor housing opening 6, as described previously herein. Since the condenser housing 3 is preferably mounted in the bracket 1 with its side wall close to the bracket body 8, the connection leads 7 are well protected throughout their extent.

The condenser cap 20 and the housing 3 have the same peripheral form and dimension so that in assembly the cap 20 is effectively a continuation of the housing 3. The cap and housing are joined in open-end to open-end relation with interfitting ends. The cap 20 has its wall reduced at the open end to form an annular reduced diameter tongue 25 which extends within the open end of the housing 3 in lateral bearing relation with the inner surface of the housing, and the cap shoulder resulting from the formation of the cap end tongue 25 seats on the annular end surface 26 of the housing 3. A notch 27 is provided in the inner end wall of the housing 3 and a nub 28 is provided on the cap tongue 25 for fitting in the housing notch 27 to rotarily locate the cap 20 with respect to the housing 3.

The assembly of the condenser cap 20 and housing 3 is held in the bracket 1 in end to end resilient support, with the side wall of the housing close to the bracket body 8, in such a manner as to be held against rotation with respect to the bracket 1, and in such an arrangement as to position the cap side wall lead wire opening 24 adjacent and over the bracket lead wire opening 10. The mounting of the condenser assembly in the bracket 1 in this manner and arrangement is accomplished through the interfitting of the bracket uprights 12 and 13 with integrally molded assembly formations 29 and 30 formed respectively in the outer faces of the closed ends of the condenser cap 20 and housing 3. Since the bracket uprights 12 and 13 are duplicates, the assembly formations 29 and 30 are also similarly duplicates and in the assembly of the cap 20 and housing 3 the assembly formations 29 and 30 are in all parts in alignment with each other. This is accomplished by providing the same peripheral location relation between the cap nub 28 and the cap assembly formation 29 as is provided between the housing notch 27 and the housing assembly formation 30. Further, the cap side wall lead wire opening 24 is so positioned peripherally with respect to the cap assembly formation 29 as to locate the cap wall opening 24 adjacent and over the bracket lead wire opening 10 upon the interfitting of one of the bracket uprights 12 and 13 with the cap assembly formation 29.

The condenser cap assembly formation 29 comprises a right angled wall recess 31 in the cap end wall outer surface, of an elongated arch form in outline duplication of the bracket upright 12, and of a general depth comparable to the thickness of the bracket upright 12 so that the bracket upright may fit in the recess or keyway 31 with the outer surface of the bracket upright substantially flush with the condenser cap end wall outer surface, and an integrally formed, centrally disposed upstanding pin 32. The recess arch has an open base 33 forming a step in the end wall periphery of the cap 20 in which the top of the bracket upright 12 may be placed as a step in the mounting of the cap and housing assembly in the bracket 1. The recess 31 is formed in two depths with the area of greatest depth extending in general rectangular form from the cap periphery to a laterally perpendicular cross line 34 formed by a perpendicular step wall dividing the recess areas of different depths, which corresponds to the lateral axis diameter of the bracket upright opening 18, and the area of least depth extending from the line 34 throughout the remainder of the general recess 31 in general arch form.

The provision of the two recess depths described above, with the shallower area to contain the upper portion of the bracket upright 12 assures positive cap holding engagement by the upper portion of the bracket regardless of minor length dimension variations of housings, caps, and brackets which may be assembled in accordance with this invention.

The pin 32 is in the form of an upright cylinder in the recess 31, located on the recess division line 34 and designed to fit in the bracket upright opening 18. The end face of the pin 32 is substantially flush with the cap end outer surface.

The condenser housing assembly formation 30 is formed in the same relation to the bracket upright 13 as has been described for the cap assembly formation 29 and the bracket upright 12.

Thus, the complete assembly is accomplished by first securing the bracket 1 to the motor 2, connecting the lead wires 7 to the electrode terminals 22 and 23, assembling the condenser cap 20 with the condenser housing 3, locating the upper ends of the bracket uprights 12 and 13 in the lower portions of the cap and condenser assembly recesses, and then snapping the assembly into place with the assembly recess pins 32 in the bracket upright openings 18 and 19.

As schematically indicated on Figure 6, any one of a series of condenser caps or housings may be used with a single bracket by providing assembly recess and pin formations of the same size and edge location for each cap or housing regardless of the size change thereof. Also indicated in Figure 6 is the feature that, due to the substantially line contacts of the bottom edges of the bracket body sides 9 and the general inverted U formation of the bracket, the bracket may be readily firmly mounted on a flat plane surface or any one of a series of surfaces of different curvature, as for example, on any one of a series of motor housings of different diameters.

Thus, further advantages of this invention are:

This structure is much simpler than previously used structures, fewer parts are needed, and the bracket the condenser combines with to form a condenser assembly is small and yet has sufficient strength to properly hold and support the condenser.

The electrical leads and connections are out of the way and protected.

The condenser may be snapped in or out of operative assembly, making replacement simple and easy.

The condenser is held against rotation which might put a strain on the electrical leads, and may be assembled without special tools or equipment other than the normal soldering iron for terminal connections.

There is better heat dissipation than in previous structures, since the structure of this invention has only a single housing, not a housing within a housing or a housing with assembly sleeves or coverings.

Any one of a size graduated series of housings may be used with the same bracket.

The assembly formations on the condenser housing do not interfere if it is desired to use the condenser without the bracket.

What is claimed is:

1. An electrolytic condenser assembly comprising a moulded plastic cylindrical housing with an open end; condenser electrodes and electrolyte in said housing; a sealing disc in said open end of said housing having terminals for said electrodes mounted thereon; a cap on said housing covering said open end and said electrode terminals, said cap having a side wall opening; assembly formations on the base of said housing and on the end face of said cap, said formations each comprising a stepped arch-like recess with the shallower step at the top of the arch and an upstanding pin located at the line of division of said steps, the base of said cap arch being peripherally aligned with said cap side wall opening; interfitting tongue and recess formations on said cap and housing aligning said cap and base assembly formations; and a mounting bracket with an elongated body of inverted U channel formation extending substantially the length of said housing and cap, a central elongated opening in the base of said U channel through which said bracket may be secured to a support, and a wire lead opening adjacent each end of said central opening, with one of said lead openings aligned with said cap side wall opening; said bracket further having upstanding and resilient end arms located in and substantially fitting said cap and base assembly formations, with central openings containing said cap and base upstanding pins, and turned back top portions; whereby said cap and housing are together resiliently held by said bracket arms.

2. The combination, with a condenser casing of insulating material including a plastic base, a cylindrical housing of plastic material integrally formed with said base, and a cap of plastic material adapted to be fixed on said housing, said cap and said base each having an indentation formed therein with a protruding portion extending from the central part of said indentation, of an elongated supporting bracket having resilient upstanding end members which are adapted, respectively, to fit into the indentations on said base and said cap, said end members having passages therein for receiving the respective protruding portions of said base and said cap, depending flanges extending along the longitudinal edges of said bracket, means defining a central slot extending longitudinally of said bracket, and depending portions of lesser width than said flanges extending along the edges of said slot whereby the bracket may be readily mounted either on a plane or curved surface.

3. The combination, with a condenser casing of insulating material including a plastic base, a cylindrical housing of plastic material integrally formed with said base, and a cap of plastic material adapted to be fixed on said housing, said cap and said base each having stepped indentations formed therein with a protruding portion extending from the central part of said indentations, of a supporting bracket having resilient upstanding end members which are adapted, respectively, to fit into the stepped indentations on said base and said cap, the end of each member being outwardly bent and engaging the adjacent stepped part of the casing whereby the bent end portion projects beyond the end of the casing to facilitate removal thereof from the bracket, said end members having passages therein for receiving the respective protruding portions on said base and said cap, said bracket having openings formed therein which are adapted to receive supporting screws for mounting said condenser casing.

4. The combination, with a condenser casing of insulating material including a plastic base, an elongated housing of plastic material integrally formed with said base, and a cap of plastic material adapted to be fixed on said housing, said cap having an aperture formed therein to permit leads to be attached to the terminals of a condenser within said casing, of a supporting bracket comprising resilient upstanding end members which are adapted, respectively, to engage said base and said cap, said bracket having a longitudinally extending slot and openings spaced from the respective ends of said slot, one of said openings being adapted to register with the aperture in said cap when the casing is held between said resilient end members.

5. The combination, with a condenser casing of insulating material including a plastic base, an elongated housing of plastic material integrally formed with said base, and a cap of plastic material adapted to be fixed on said housing and having an aperture therein to permit leads to be attached to the terminals of a condenser mounted within said casing, said cap and said base having indentations formed therein with a protruding portion extending from the central part of each indentation, of a supporting bracket having resilient upstanding end members which are adapted, respectively, to fit into the indentations on said said base and said cap, said end members having passages therein for receiving the respective protruding portions on said base and said cap, said bracket having a longitudinally extending slot and openings spaced from the respective ends of said slot, one of said openings being adapted to register with the aperture in said cap when the casing is held between said resilient end members.

6. The combination, with a condenser casing of insulating material including a plastic base, a cylindrical housing of plastic material integrally formed with said base, a condenser mounted in said casing having terminals at the open end of said casing, and a cap of plastic material adapted to be fixed on said housing and having an aperture therein to permit the connection of leads to said terminals, said cap and said base having indentations formed therein with a protruding portion extending from the central part of each indentation, of a supporting bracket having resilient upstanding end members which are adapted, respectively, to fit into the indentations on said base and said cap, said end members having passages therein for receiving the respective protruding portions on said base and said cap, said bracket having a longitudinally extending slot and openings spaced from the respective ends of said slot, one of said openings being adapted to register with the aperture in said cap when the casing is held between said resilient end members whereby said leads may extend through one of said openings for connection to an external circuit.

7. The combination with a condenser casing of insulating material including a plastic base, a cylindrical housing of plastic material integrally formed with said base, and a cap of plastic material adapted to be fixed on said housing, said cap and said base each having an eccentrically located non-circular indentation on an outer face thereof, each of said indentations having a protruding portion extending from the base thereof; of a supporting bracket having resilient upstanding end members with such contour at their upper extremities as to rotationlessly fit in said indentations, said end members having passages oriented with said contour so as to receive the respective protruding portions on said base and said cap whereby said condenser casing is seated in a rotationlessly fixed position between said end members.

8. The combination with a condenser casing of insulating material including a plastic base, a cylindrical housing of plastic material integrally formed with said base, and a cap of plastic material adapted to be fixed on said housing opposite said base in a predetermined radial position with respect thereto, said cap and said base each having an outwardly facing keyway, one keyway being aligned with the other as the result of said predetermined radial position of said cap, each of said keyways having a protruding portion extending from an inner section thereof; of a supporting bracket having resilient upstanding end members to support said condenser casing therebetween, each of said end members having an upper body portion formed to the internal contour of each of said keyways, said body portion including a recess for a snap-in fit over said protruding portion whereby said condenser casing is held between said end members in a radially fixed rotationless position.

9. The combination with a condenser casing of insulating material including a plastic base, a cylindrical housing of plastic material integrally formed with said base, and a cap of plastic material adapted to be fixed on said housing, said cap and said base each having aligned stepped indentations formed therein extending from the circumferential edge thereof toward their center and having a protruding portion extending from the central region of said indentations; of a supporting bracket having resilient upstanding end members, said end members having such shape as to fit into and to conform to the contours of said stepped indentations on said base and cap and having passages therein conforming to and for receiving the respective protruding portions on said base and cap whereby upon pressing said casing against said end members in properly aligned position around its axis said end members will snap into positively interlocked positions with the indentations and protruding portions on said base and cap and the casing will be held in an axially aligned rotationless position from which it is non-removable without spreading apart the end members of the supporting bracket.

10. The combination with a condenser casing of insulating material including a plastic base, a cylindrical housing of plastic material integrally formed with said base and having an end opposite the latter formed with an annular seat and notch therein, and a cap of plastic material for a rotationless fit in said annular seat, said cap and said base each having an eccentrically located non-circular indentation on an outer face thereof, each of said indentations having a protruding portion extending from the base thereof; of a supporting bracket having resilient upstanding end members with such contour at their upper extremities as to rotationlessly fit in said indentations, said end members having passages oriented with said contour so as to receive the respective protruding portions on said base and said cap, said cap being effectively forced into said annular seat of the housing solely by the spring action of said resilient end members whereby said condenser casing is seated in a rotationlessly fixed position between said end members.

GORDON V. PECK.

REFERENCES CITED

The following references are of record in the file of this patent:

UNITED STATES PATENTS

| Number | Name | Date |
|---|---|---|
| 1,370,502 | Livingston | Mar. 1, 1921 |
| 1,908,800 | Utne | May 16, 1933 |
| 1,954,088 | Martin et al. | Apr. 10, 1934 |
| 2,047,452 | Zahodiakin | July 14, 1936 |
| 2,058,773 | Cole | Oct. 27, 1936 |
| 2,114,876 | Forbes | Apr. 19, 1938 |
| 2,144,959 | Blackburn | Jan. 24, 1939 |
| 2,264,900 | Georgiev | Dec. 2, 1941 |
| 2,267,717 | Brennan | Dec. 30, 1941 |
| 2,388,848 | Howe | Nov. 13, 1945 |